US006564616B2

(12) United States Patent
Antonioli et al.
(10) Patent No.: US 6,564,616 B2
(45) Date of Patent: May 20, 2003

(54) METHOD OF DIAGNOSING LEAKAGE IN AN INTERNAL COMBUSTION ENGINE COMMON-RAIL INJECTION SYSTEM

(75) Inventors: Pierpaolo Antonioli, Piossasco (IT); Cristiana Davide, Turin (IT); Mario Reale, H. Porzio Catone (IT)

(73) Assignee: C R F Societa Consortile per Azioni (IT)

( * ) Notice: Subject to any disclaimer, the term of this patent is extended or adjusted under 35 U.S.C. 154(b) by 0 days.

(21) Appl. No.: 09/993,380

(22) Filed: Nov. 14, 2001

(65) Prior Publication Data

US 2002/0112528 A1 Aug. 22, 2002

(30) Foreign Application Priority Data

Nov. 14, 2000 (IT) ....................................... TO2000A17

(51) Int. Cl.[7] .......................... G01M 3/04; G01M 15/00

(52) U.S. Cl. ....................................... 73/49.7; 73/119 A

(58) Field of Search ........................ 73/49.7, 40, 119 A, 73/116; 123/436, 679, 406.13; 701/99, 102, 103

(56) References Cited

U.S. PATENT DOCUMENTS 5,129,379 A * 7/1992 Kaneyasu ................... 123/436
5,157,965 A * 10/1992 Koegeler ..................... 73/116
5,361,628 A * 11/1994 Marko ......................... 73/116
5,446,664 A * 8/1995 Vossen ....................... 701/101
5,773,716 A * 6/1998 Antonioli et al. ......... 73/119 A

FOREIGN PATENT DOCUMENTS

EP 785358 A2 * 7/1997 .......... F02M/65/00
JP 05332886 A * 12/1993 .......... G01M/15/00

* cited by examiner

*Primary Examiner*—Daniel S. Larkin
*Assistant Examiner*—Jay L Politzer
(74) *Attorney, Agent, or Firm*—Pennie & Edmonds LLP

(57) ABSTRACT

There is described a method of diagnosing leakage in a common-rail injection system of an internal combustion engine having a number of cylinders; the injection system having a number of injectors, each supplying high-pressure fuel to a respective cylinder of the engine, and a fuel supply circuit supplying fuel to the injectors. The diagnosis method includes the steps of determining the contribution of each cylinder to the angular acceleration of the engine; determining, for each cylinder, an unbalance index indicating the unbalance of the angular acceleration contribution of the cylinder with respect to the angular acceleration contributions of the other cylinders; reducing, upon detection of a fault in the injection system, the amount of fuel injected into each cylinder; and distinguishing, for each injector, between a jammed-open injector condition and a fault condition in the fuel supply circuit, on the basis of the variation in the unbalance index of the respective cylinder following the fuel reduction.

14 Claims, 2 Drawing Sheets

METHOD OF DIAGNOSING LEAKAGE IN AN INTERNAL COMBUSTION ENGINE COMMON-RAIL INJECTION SYSTEM

The present invention relates to a method of diagnosing leakage in an internal combustion engine common-rail injection system.

BACKGROUND OF THE INVENTION

As is known, of the various problems that can occur in a common-rail injection system, the worst and most dangerous are one or more of the injectors jamming in the open position, and fuel leakage in the high-pressure fuel supply circuit, which results in fuel discharge in the form of a very fine spray.

On the one hand, high-pressure fuel leakage may cause a fire if the fuel spray should strike particularly hot engine surfaces; and, on the other, a jammed-open injector results in continuous fuel supply to the cylinders, in turn resulting not only in excessive fuel consumption but also in abnormal combustion characterized by pressure peaks and a considerable temperature increase in the cylinders.

Such defects can only be tolerated so long without causing serious damage to the engine, e.g. to the connecting rod, piston, or injector nozzles, and may immediately impair performance and safety of the vehicle.

To safeguard against such hazards, diagnostic units were proposed to detect fuel leakage in the injection system and to act on the injection system to cut off fuel supply to the injectors and so stop the engine immediately.

More specifically, such units operated by comparing the fuel pressure in the common rail or total fuel consumption of the engine with respective threshold values, and determined the presence or not of any hazardous situations accordingly.

Common-rail injection systems, however, are also subject to fuel leakage in the low-pressure fuel supply circuit—caused, for example, by fine cracks in the low-pressure conduits—or to faulty low-pressure fuel supply circuit components preventing correct fuel supply to the high-pressure fuel supply circuit.

Such leakage and defects, however, are not as serious as a jammed-open injector or high-pressure fuel spray, by not immediately impairing engine performance or the safety of the vehicle, which, in such cases, in fact, can safely be driven at least to the nearest repair shop.

Known diagnostic units of the above type, however, were unable to distinguish between fuel leakage in the high-pressure fuel supply circuit and fuel leakage or faults in the low-pressure fuel supply circuit, so that, even in the case of minor, nonhazardous faults in the low-pressure fuel supply circuit, known diagnostic units immediately disabled the vehicle, thus causing considerable inconvenience to the driver, out of all proportion to the immediate danger involved.

One of the many solutions proposed to at least partly eliminate the above drawback is described in the Applicant's European Patent Application EP-0786593, which proposes a fuel catch structure for determining fuel leakage from the high-pressure fuel supply conduits connecting the injectors to the common rail.

More specifically, the fuel catch structure comprises a number of sleeves made of elastomeric material, surrounding the injector supply conduits, and for catching any fuel leaking from the conduits; a catch header connected to and for collecting from the sleeves any fuel leaking from the injector supply conduits; a fluid sensor located at the bottom of the catch header to generate a leak signal indicating the presence of fuel in the catch header; and an alarm circuit connected to the fluid sensor to generate an alarm signal in the presence of fuel in the catch header.

Though advantageous in many respects, the above solution has several drawbacks preventing its advantages from being fully exploited.

More specifically, fuel leakage from the high-pressure supply conduits is determined using additional dedicated components not normally provided on the vehicle—such as the sleeves, catch header, fluid sensor, and alarm circuit—and which, besides costing money to manufacture or purchase and assemble, also call for regular servicing.

Moreover, the catch structure described above was only capable of determining one type of fault in the high-pressure fuel supply circuit—namely, fuel leakage from the high-pressure supply conduits—so that any other faults in the high-pressure fuel supply circuit, such as a jammed-open injector, remained undiagnosed.

Another solution proposed to at least partly eliminate the above drawbacks is described in the Applicant's European Patent Application EP-0785349, which proposes a diagnostic unit designed to determine the type of fault in the high-pressure fuel supply circuit, and in particular to distinguish between a jammed-open injector and a generic fault in the high-pressure fuel supply circuit.

More specifically, the diagnostic unit employs an accelerometer signal related to engine vibration intensity and generated by an accelerometer sensor on the engine block; and a position signal indicating the angular position of the drive shaft (engine angle). More specifically, the diagnostic unit compares the amplitude of the accelerometer signal with a first reference value; compares with a second reference value the engine angle value at which the amplitude of the accelerometer signal exceeds the first reference value; and determines a jammed-open injector condition according to the outcome of the two comparisons.

Though advantageous in many respects, the above solution has one drawback preventing its advantages from being fully exploited.

More specifically, the type of fault in the high-pressure fuel supply circuit is determined using an additional dedicated component not normally provided on the vehicle, i.e. the accelerometer sensor, which, besides costing money to manufacture or purchase and assemble, also calls for regular servicing.

To eliminate the above drawback, the Applicant's European Patent Application EP-0785358 proposes a diagnostic unit designed to determine the type of fault in the fuel supply circuit as a whole, and in particular to distinguish between a jammed-open injector and a generic fault in the fuel supply circuit, without requiring the use of an additional accelerometer sensor not normally provided on the vehicle.

More specifically, the diagnostic unit first determines the presence of faults in the fuel supply circuit by comparing the fuel pressure in the common rail or the total fuel consumption of the engine with respective threshold values; and, in the event any faults are determined, distinguishes between a jammed-open injector and a generic fault in the fuel supply circuit on the basis of the engine torque, which is determined using a position and speed signal indicating the speed and angular position of the drive shaft and generated by a drive shaft speed and angular position detecting device already provided on the vehicle and substantially comprising a sound wheel fitted to the drive shaft, and an electromagnetic sensor associated with the sound wheel.

More specifically, if any faults are detected in the fuel supply circuit, the diagnostic unit reduces—in particular, cuts off—fuel injection into each engine cylinder; calculates, on the basis of said position and speed signal, the contribution of each cylinder to the value of the useful torque generated by the engine; compares each contribution with a respective reference value; and determines a jammed-open injector condition when at least one contribution is above the respective reference value, and a fault condition in the fuel supply circuit when all the contributions are below the respective reference values.

That is, if the diagnosed fuel leakage is caused by a fault in the fuel supply circuit, the reduction in the amount of fuel injected into the cylinders produces a corresponding reduction in the useful torque contribution of each cylinder; which reduction can easily be calculated as a function of the reduced injection time of each injector. Conversely, if the diagnosed fuel leakage is caused by a jammed-open injector, the reduction in the amount of fuel injected produces a smaller reduction in useful torque contributions than in the previous case, owing to the jammed-open injector feeding fuel continuously to the respective cylinder, which therefore shows no reduction in its contribution to the useful torque generated by the engine.

Though advantageous in many respects, the above solution has a minor drawback preventing its advantages from being fully exploited.

More specifically, a jammed-open injector is distinguished from a generic fault in the high-pressure supply circuit by comparing with a respective reference value the contribution of each cylinder to the useful torque generated by the engine. Computer simulation and road tests conducted by the Applicant, however, show fault diagnoses based on the above comparison to be unreliable in certain engine operating conditions. In particular, fault recognition problems may arise during transient operating states of the engine, e.g. during release.

SUMMARY OF THE INVENTION

It is therefore an object of the present invention to provide a leakage diagnosis method designed to eliminate the aforementioned drawbacks.

The present invention provides a method of diagnosing leakage in a high-pressure injection system of an internal combustion engine, which can comprise a number of cylinders. The injection system can comprise a number of injectors, each supplying high-pressure fuel to a respective cylinder of the engine, and a fuel supply circuit supplying fuel to the injectors. The diagnosis method can comprise the steps of: determining, for each of the cylinders, a quantity ($AC_i$) related to the contribution of the cylinder to the torque generated by the engine; determining, for each of the cylinders, an unbalance index ($IS_i$) indicating the unbalance of the quantity ($AC_i$) related to the contribution of the cylinder to the torque generated by the engine with respect to the quantities ($AC_i$) related to the contributions of the other cylinders to the torque generated by the engine; reducing, upon detection of a fault in the injection system, the amount of fuel injected into each of the cylinders; and distinguishing, for each of the injectors, between a jammed-open injector condition and a fault condition in the fuel supply circuit, on the basis of the variation in the unbalance index ($IS_i$) of the respective cylinder following the fuel reduction.

In one embodiment of the diagnosis method, the quantity ($AC_i$) related to the contribution of a cylinder to the torque generated by the engine can be the contribution of the cylinder to the angular acceleration of the engine.

In another embodiment of the diagnosis method, the unbalance index ($IS_i$) associated with each of the cylinders can be related to the difference between the quantity ($AC_i$) related to the contribution of the cylinder to the torque generated by the engine, and a mean value of the quantities ($AC_i$) related to the contributions of the other cylinders to the torque generated by the engine.

In a further embodiment of the diagnosis method, the step of distinguishing, for each of the injectors, between a jammed-open injector condition and a fault condition in the fuel supply circuit can comprise the steps of: determining a differential unbalance index ($D_i$) as a function of an unbalance index ($IS_i$) prior to detection of the fault in the injection system, and of an unbalance index ($IS_i$) following detection of the fault in the injection system; comparing the differential unbalance index ($D_i$) with a threshold value ($D_{THi}$); determining a jammed-open injector condition when the differential unbalance index ($D_i$) has a first predetermined relationship with the threshold value ($D_{THi}$); and determining a fault condition in the fuel supply circuit when the differential unbalance index ($D_i$) does not have the first predetermined relationship with the threshold value ($D_{THi}$).

In one exemplary embodiment of the diagnosis method, the differential unbalance index ($D_i$) can be related to the difference between the unbalance index ($IS_i$) prior to detection of the fault in the injection system, and the unbalance index ($IS_i$) following detection of the fault in the injection system.

In another exemplary embodiment of the diagnosis method, the unbalance index ($IS_i$) following detection of the fault in the injection system can be calculated at the end of a transient operating state generated by the reduction in the amount of fuel injected into the cylinders.

In a further exemplary embodiment of the diagnosis method, the unbalance index ($IS_i$) prior to detection of the fault in the injection system can be calculated immediately prior to detection of the fault in the injection system.

In a still further exemplary embodiment of the diagnosis method, the step of determining a jammed-open injector can comprise the step of determining whether the differential unbalance index ($D_i$) is greater than the threshold value ($D_{THi}$).

In a still further exemplary embodiment of the diagnosis method, the step of determining a differential unbalance index ($D_i$) can comprise the steps of: filtering the unbalance index ($IS_i$) to generate a filtered unbalance index ($ISF_i$); and determining the differential index ($D_i$) as a function of an unbalance index ($IS_i$) following detection of the fault in the injection system, and of a filtered unbalance index ($ISF_i$) prior to detection of the fault in the injection system.

In another embodiment of the diagnosis method, the step of determining an unbalance index ($IS_i$) for each of the cylinders can comprise the steps of: filtering the quantity ($AC_i$) related to the contribution of the cylinder to the torque generated by the engine to generate a filtered quantity ($ACF_i$) related to the contribution of the cylinder to the torque generated by the engine; and determining the unbalance index ($IS_i$) as a function of the filtered quantity ($ACF_i$).

In a further embodiment of the diagnosis method, the step of determining a fault in the injection system can comprise the steps of: determining the fuel pressure ($P_{RAIL}$) of the fuel injected by the injectors; comparing the fuel pressure ($P_{RAIL}$)

with a threshold value ($P_{MIN}$); and determining the fault in the injection system when the fuel pressure ($P_{RAIL}$) has a first predetermined relationship with the threshold value ($P_{MIN}$).

In an exemplary embodiment of the diagnosis method, the step of determining a fault in the injection system can comprise the step of determining whether the fuel pressure ($P_{RAIL}$) is below the threshold value ($P_{MIN}$).

In another embodiment of the diagnosis method, the fault in the injection system can be defined by a fuel leak in the injection system.

In a further embodiment of the diagnosis method, an engine can be provided which can comprise an exhaust gas recirculating system having a regulating valve. Additionally or alternatively, the diagnosis method can comprise the step of closing the regulating valve upon detection of the fault in the injection system.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
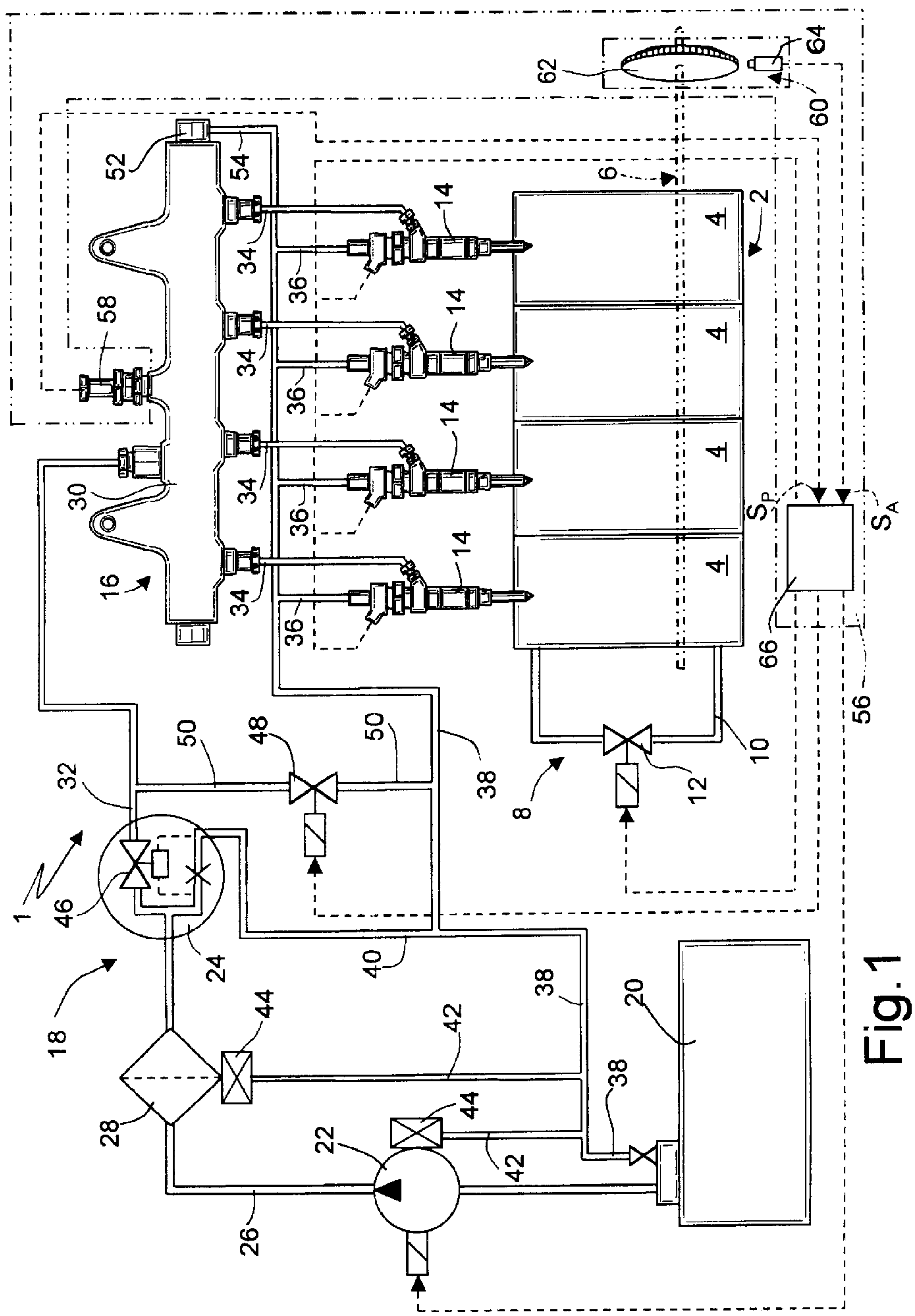
FIG. 1 shows a simplified diagram of a common-rail injection system.

Number 1 in FIG. 1 indicates as a whole a common-rail injection system for an internal combustion engine, in particular a diesel engine, 2 comprising a number of cylinders 4, an output shaft 6 (shown schematically by the dot-and-dash line), and an exhaust gas recirculation (EGR) system 8.

More specifically, exhaust gas recirculation system 8 provides for feeding part of the exhaust gas in the exhaust manifold of the engine back into the intake manifold of engine 2, for reducing the combustion temperature and the formation of nitric oxide (NOx), and is shown schematically in FIG. 1 by a conduit 10 fitted with a regulating valve 12.

Injection system 1 substantially comprises a number of injectors 14 supplying high-pressure fuel to cylinders 4 of engine 2; a high-pressure supply circuit 16 supplying high-pressure fuel to injectors 14; and a low-pressure supply circuit 18 supplying low-pressure fuel to high-pressure supply circuit 16.

Low-pressure supply circuit 18 comprises a fuel tank 20; a supply pump 22, e.g. electric, immersed in the fuel in tank 20 (but shown outside tank 20 for reasons of clarity); a high-pressure pump 24 connected to supply pump 22 by a low-pressure supply line 26; and a fuel filter 28 located along low-pressure supply line 26, between supply pump, 22 and high-pressure pump 24.

High-pressure supply circuit 16 comprises a known common rail 30 connected by a high-pressure supply line 32 to high-pressure pump 24, and by respective high-pressure supply conduits 34 to injectors 14, which are also connected by respective recirculating conduits 36 to a drain line 38, in turn connected to tank 20 to feed back into tank 20 part of the fuel used in known manner by and for operation of injectors 14.

Drain line 38 is also connected to high-pressure pump 24 by a respective recirculating conduit 40, and to supply pump 22 and fuel filter 28 by respective recirculating conduits 42 and respective overpressure valves 44.

High-pressure pump 24 is fitted with an on/off, so-called shut-off, valve 46 (shown schematically) for permitting supply to the pumping elements (not shown) of high-pressure pump 24 when a difference in pressure exists between low-pressure supply line 26 and recirculating conduit 40.

High-pressure supply circuit 16 also comprises a pressure regulator 48 connected between high-pressure supply line 32 and drain line 38 by a recirculating conduit 50, and which, when activated, provides for feeding back into tank 20 part of the fuel supplied by high-pressure pump 24 to common rail 30, and so regulating, in known manner not described in detail, the pressure of the fuel supplied by high-pressure pump 24, and hence the fuel pressure in common rail 30.

High-pressure supply circuit 16 also comprises a pressure relief device 52 connected on one side to common rail 30 and on the other side by a recirculating conduit 54 to drain line 38, and which prevents the fuel pressure in common rail 30 from exceeding a predetermined maximum value.

Injection system 1 also comprises a diagnostic unit 56 for detecting and diagnosing leakage in injection system 1.

More specifically, diagnostic unit 56 comprises a pressure sensor 58 connected to common rail 30 and generating a pressure signal $S_P$ related to the fuel pressure in common rail 30 and therefore to the fuel injection pressure; and a detecting device 60 for detecting the speed and angular position of output shaft 6, and in turn comprising a known sound wheel 62 fitted to output shaft 6, and an electromagnetic sensor 64 facing sound wheel 62 and generating a position and speed signal $S_A$ indicating the speed and angular position of sound wheel 62 and therefore the speed and angular position of output shaft 6.

Diagnostic unit 56 also comprises an electronic central control unit 66 (forming part, for example, of a central engine control unit not shown) for controlling injection system 1, and which receives pressure signal $S_P$ and position and speed signal $S_A$, generates a first control signal supplied to pressure regulator 48, a second control signal supplied to supply pump 22, and a third control signal supplied to injectors 14, and performs the operations described below with reference to FIG. 2 to:

- determine the presence of a fault in injection system 1;
- determine whether the fault is due to one or more jammed-open injectors; or to leakage in the fuel supply circuit caused, for example, by cracks in the high-pressure conduits; or to a generic fault in the low-pressure supply circuit; and
- act appropriately on injection system 1 according to the type of fault diagnosed.

More specifically, each of the leakage diagnosis operations described below with reference to the FIG. 2 flow chart is repeated by electronic central control unit 66 at a frequency which, as opposed to being constant, depends on the speed of engine 2.

Figure 2:
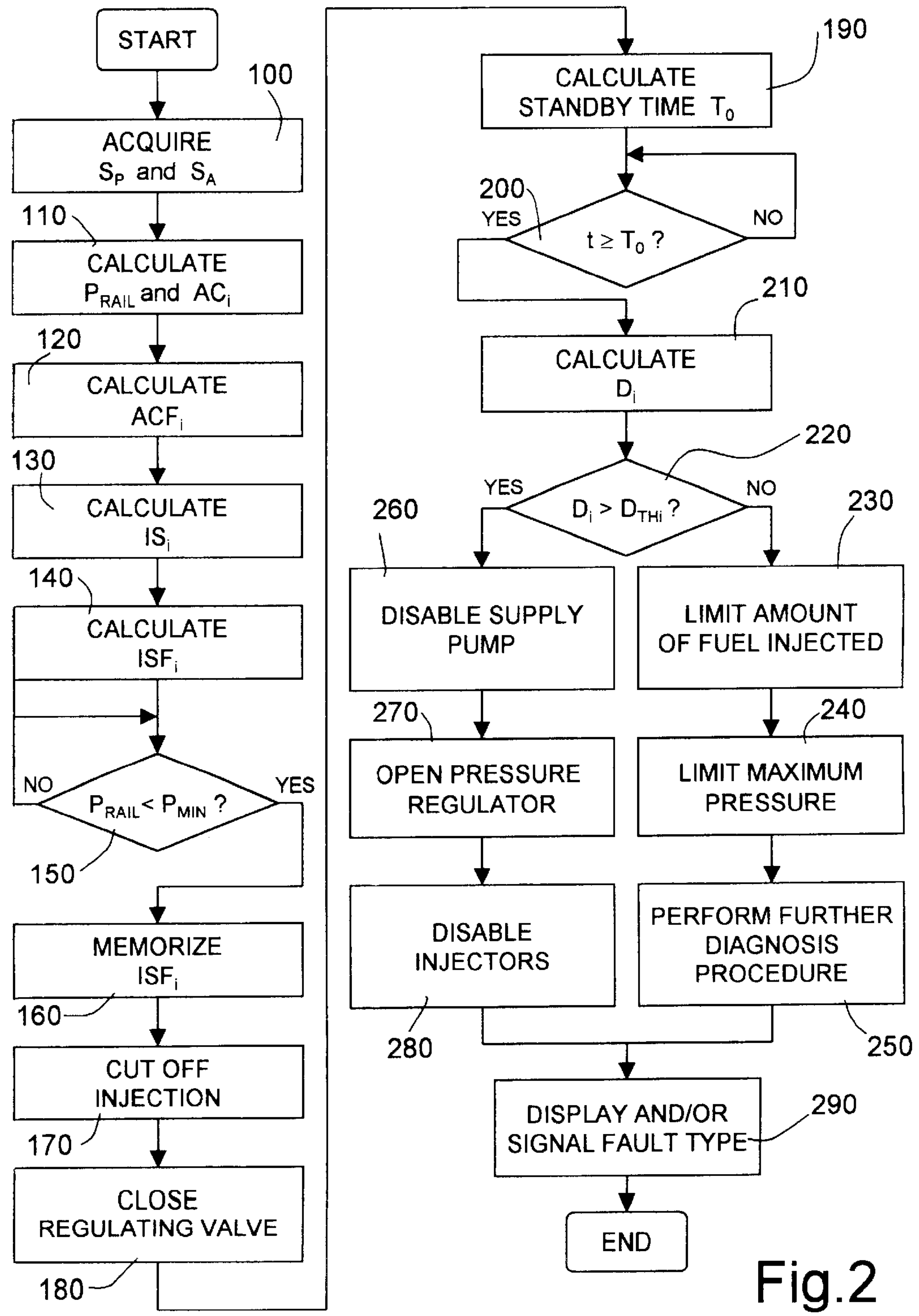
FIG. 2 shows a flow chart of the leakage diagnosis method according to the present invention.

For example, each of the leakage diagnosis operations in the FIG. 2 flow chart may be performed by electronic central control unit 66 at each fuel injection, i.e. at each engine cycle.

More specifically, as shown in FIG. 2, electronic central control unit 66 first acquires pressure signal $S_P$ and position and speed signal $S_A$ (block 100), and determines, as a function of pressure signal $S_P$, the instantaneous pressure value $P_{RAIL}$ of the fuel in common rail 30, and, as a function of position and speed signal $S_A$, a quantity $AC_i$ related to the contribution of each cylinder 4 to the useful torque generated by engine 2 (block 110).

More specifically, quantity $AC_i$ is defined by the contribution of each cylinder 4 to the angular acceleration of output shaft 6 of engine 2, which is hereinafter referred to as "angular acceleration contribution $AC_i$"—where the subscript "i" indicates the respective cylinder 4—and may, for example, be calculated as described in detail in the Applicant's European Patent Application EP 637738.

Calculating the angular acceleration contribution, as opposed to the torque contribution, of each cylinder 4 is preferred, firstly, because, as is known, the two quantities are closely related—in particular, are proportional—and, secondly, because calculating the torque contribution of each cylinder necessarily involves calculating the angular acceleration contribution anyway.

Electronic central control unit 66 then filters the angular acceleration contributions $AC_i$ of each cylinder 4 to generate, for each cylinder 4, a sequence of filtered angular acceleration contributions $ACF_i$ (block 120). More specifically, angular acceleration contributions $AC_i$ of each cylinder 4 are filtered in known manner, not described in detail, using a conventional low-pass numeric filter with a pass band for attenuating oscillations in engine speed induced by transmitting torque from the engine to the wheels.

As a function of respective filtered angular acceleration contributions $ACF_i$, electronic central control unit 66 then calculates (block 130), for each cylinder 4, an unbalance index $IS_i$ indicating the unbalance of the respective filtered angular acceleration contribution $ACF_i$ with respect to the mean values of the filtered angular acceleration contributions $ACF_i$ of the other cylinders 4, and which is calculated according to the equation;

$$IS_i = ACF_i - \sum_{j \neq i} (a_j \cdot ACF_j)$$

where $a_j$ is the weight attributed to each filtered angular acceleration contribution $ACF_i$, and may, for example, be a constant value $a_j = 1/(n-1)$, where n equals the number of cylinders 4 of engine 2.

Electronic central control unit 66 then filters the unbalance indexes $IS_i$ of each cylinder 4 to generate, for each cylinder 4, a sequence of filtered unbalance indexes $ISF_i$ (block 140). More specifically, the unbalance indexes $IS_i$ of each cylinder 4 are filtered in known manner, not described in detail, using a conventional numeric filter.

Simultaneously with the above operations in blocks 100–140, electronic central control unit 66 compares the instantaneous pressure value $P_{RAIL}$ of the fuel in common rail 30 with a minimum pressure value $P_{MIN}$, which is a function of engine speed and represents the minimum fuel pressure below which injection system 1 is definitely malfunctioning and calls for a procedure to determine the cause (block 150).

For example, minimum pressure value $P_{MIN}$ may range between 120 and 200 bars, and, in particular, may be about 120 bars for engine speeds below 2300 rpm, about 200 bars for engine speeds over 2500 rpm, and may increase linearly from 120 to 200 bars for engine speeds between 2300 and 2500 rpm.

If instantaneous pressure value $P_{RAIL}$ is greater than or equal to minimum pressure value $P_{MIN}$ (NO output of block 150), electronic central control unit 66 diagnoses no fault in injection system 1 and goes back to the input of block 150 to continue comparing instantaneous pressure value $P_{RAIL}$ and minimum pressure value $P_{MIN}$. Conversely, if instantaneous pressure value $P_{RAIL}$ is below minimum pressure value $P_{MIN}$ (YES output of block 150), electronic central control unit 66 diagnoses a leak in injection system 1 and performs the operations described below to determine whether leakage is due to one or more jammed-open injectors, or to a generic fault in high- and low-pressure supply circuits 16, 18.

More specifically, upon the fuel leakage being detected, electronic central control unit 66 memorizes the filtered unbalance index $ISF_i$ of each cylinder 4 immediately prior to the fault in injection system 1 being detected in block 150 (block 160), cuts off injection to completely disable injectors 14 (block 170), and closes regulating valve 12 of exhaust gas recirculating system 8 (block 180).

More specifically, regulating valve 12 of exhaust gas recirculating system 8 is closed to reduce combustion dissymmetry in cylinders 4 of engine 2 caused by anomalous combustion in turn caused by recirculation of any unburned fuel in one or more of cylinders 4, in the event one or more of injectors 14 are jammed open.

At this point, electronic central control unit 66 calculates a standby time $T_0$ as a function of prememorized close time values of regulating valve 12 of exhaust gas recirculating system 8, and of the convergence of the numeric filters used to filter the angular acceleration contributions $AC_i$ of each cylinder 4 (block 190), and switches to standby for said standby time $T_0$, which is long enough for the transient state produced by injection cut-off and closure of regulating valve 12 to come to an end (block 200).

At the end of standby time $T_0$, electronic central control unit 66 calculates, for each cylinder 4, a differential unbalance index $D_i$ equal to the difference between the unbalance index $IS_i$ calculated immediately after the end of standby time $T_0$ (i.e. immediately after a fault is detected in injection system 1), and the filtered unbalance index $ISF_i$ calculated and memorized immediately prior to a fault being detected in injection system 1 (block 210). A differential unbalance index $D_i$ for each cylinder 4 is calculated to recover any dispersion in the angular acceleration of individual cylinders 4.

Electronic central control unit 66 then compares the differential unbalance index $D_i$ of each cylinder 4 with a respective threshold differential index $D_{THi}$, which may be a constant value stored in the memory of electronic central control unit 66, or may be calculated as a function of the engine operating point (air intake, load and speed, etc.) (block 220).

If the differential unbalance index $D_i$ of a cylinder 4 is less than or equal to the respective threshold differential index $D_{THi}$ (NO output of block 220), electronic central control unit 66 diagnoses a fault in high- and low-pressure supply circuits 16, 18. Conversely, if the differential unbalance index $D_i$ of a cylinder is greater than the respective threshold differential index $D_{THi}$ (YES output of block 220), electronic central control unit 66 diagnoses a jammed-open injector.

More specifically, on detecting a fault in high- and low-pressure supply circuits 16, 18, electronic central control unit 66 limits the amount of fuel supplied to injectors 14 to limit the maximum amount of fuel that can be injected into each cylinder 4 (block 230); commands pressure regulator 48 to limit the maximum pressure the fuel can assume inside common rail 30 (block 240); and performs a further known diagnosis procedure, not described in detail, to determine whether the fault lies in high-pressure supply circuit 16 or low-pressure supply circuit 18 (block 250).

Conversely, on detecting a jammed-open injector, electronic central control unit 66 disables supply pump 22 to cut off fuel supply to injectors 14 (block 260); opens pressure regulator 48 to drain off the fuel in common rail 30 (block 270); and disables all the injectors 14 to cut off fuel injection into cylinders 4 and so turn off engine 2 (block 280).

Finally, electronic central control unit 66 displays and/or indicates acoustically the type of fault diagnosed on on-vehicle optical or acoustic indicating devices.

The advantages of the leakage diagnosis method according to the present invention are as follows:

First of all, it provides for distinguishing between fuel leakage in injection system 1 caused by a jammed-open injector, and a generic fault in the high- and low-pressure supply circuits, thus enabling drastic action to be taken on injection system 1 to stop engine 2, and hence the vehicle, when this is actually called for by the gravity of the situation (jammed-open injector), and less drastic action to be taken on injection system 1 in the case of a less serious leak, so that the vehicle can reach the nearest repair shop.

Moreover, computer simulation and road tests conducted by the Applicant show the diagnosis method according to the present invention to be reliable in any operating condition of the engine, thus overcoming the limitation of the diagnosis method referred to previously.

Clearly, changes may be made to the diagnosis method as described and illustrated herein without, however, departing from the scope of the present invention.

For example, leakage in injection system 1 may be detected otherwise than as described with reference to block 150.

More specifically, as opposed to comparing instantaneous pressure value $P_{RAIL}$ and minimum pressure value $P_{MIN}$, it is possible to calculate a pressure error equal to the difference between instantaneous pressure value $P_{RAIL}$ and a reference pressure value $P_{REF}$ indicating the desired fuel pressure; compare the pressure error with a threshold value; and determine fuel leakage in injection system 1 when the pressure error is greater than the threshold value. Fuel leakage in injection system 1, in fact, prevents the fuel in common rail 30 from reaching the desired pressure value ($P_{REF}$), so that an inordinately high pressure error undoubtedly indicates leakage.

Alternatively, it is possible to compare the duty cycle of the control signal supplied to pressure regulator 48 with a threshold value; and determine leakage in injection system 1 when the duty cycle of the control signal is greater than the threshold value. Closure of pressure regulator 48, in fact, is proportional to the duty cycle of the control signal supplied to it, and the greater the closure of pressure regulator 48, the higher the fuel pressure $P_{RAIL}$ in common rail 30 should be, so that control signal duty cycle values above the normal range, e.g. constantly over 90%, indicate the difficulty of injection system 1 in reaching the desired injection pressure ($P_{REF}$) and therefore the presence of a fuel leak in injection system 1.

Moreover, the injection cut-off condition commanded by electronic central control unit 66 (block 170) may be other than as described. In particular, as opposed to a total injection cut-off, in which each injector 14 is completely disabled and no fuel is injected into respective cylinder 4, a partial injection cut-off condition may be implemented, in which each injector 14 is only partly disabled, and the amount of fuel injected into respective cylinder 4 is reduced by a predetermined amount, e.g. by half.

What is claimed is:

1. A method of diagnosing leakage in a high-pressure injection system of an internal combustion engine comprising a plurality of cylinders, the injection system comprising a plurality of injectors for supplying a high-pressure fuel to a respective cylinder of the engine and a fuel supply circuit for supplying fuel to the injectors; the diagnosis method comprising the steps of:

determining, for each of the cylinders, a first quantity related to the contribution of the cylinder to the torque generated by the engine;

determining, for each of the cylinders, an unbalance index indicating the unbalance of the first quantity with respect to a second quantity related to the contributions of the other cylinders to the torque generated by the engine;

reducing, upon detection of a fault in the injection system, the amount of fuel injected into each of the cylinders; and distinguishing, for each of the injectors, between a jammed-open injector condition and a fault condition in the fuel supply circuit, on the basis of the variation in the unbalance index of the respective cylinder following the fuel reduction.

2. The diagnosis method of claim 1, wherein the first quantity is the contribution of the cylinder to the angular acceleration of the engine.

3. The diagnosis method of claim 1, wherein the second quantity is a mean value of the quantities related to the contributions of the other cylinders to the torque generated by the engine.

4. The diagnosis method of claim 1, wherein the step of distinguishing, for each of the injectors, between a jammed-open injector condition and a fault condition in the fuel supply circuit comprises the steps of:

determining a differential unbalance index as a function of an unbalance index prior to detection of the fault in the injection system, and of an unbalance index following detection of the fault in the injection system;

comparing the differential unbalance index with a threshold value;

determining a jammed-open injector condition when the differential unbalance index has a first predetermined relationship with the threshold value; and determining a fault condition in the fuel supply circuit when the differential unbalance index does not have the first predetermined relationship with the threshold value.

5. The diagnosis method of claim 4, wherein the differential unbalance index is related to the difference between the unbalance index prior to detection of the fault in the injection system, and the unbalance index following detection of the fault in the injection system.

6. The diagnosis method of claim 4, wherein the unbalance index following detection of the fault in the injection system is calculated at the end of a transient operating state generated by the reduction in the amount of fuel injected into the cylinders.

7. The diagnosis method of claim 4, wherein the unbalance index prior to detection of the fault in the injection system is calculated immediately prior to detection of the fault in the injection system.

8. The diagnosis method of claim 4, wherein the step of determining a jammed-open injector comprises the step of determining whether the differential unbalance index is greater than the threshold value.

9. The diagnosis method of claim 4, wherein the step of determining a differential unbalance index comprises the steps of:

filtering the unbalance index to generate a filtered unbalance index; and determining the differential index as a function of an unbalance index following detection of the fault in the injection system, and of a filtered unbalance index prior to detection of the fault in the injection system.

10. The diagnosis method of claim 1, wherein the step of determining an unbalance index for each of the cylinders comprises the steps of:

filtering the first quantity to generate a filtered quantity related to the contribution of the cylinder to the torque generated by the engine; and determining the unbalance index as a function of the filtered quantity.

11. The diagnosis method of claim 1, wherein the step of determining a fault in the injection system comprises the steps of:

determining the fuel pressure of the fuel injected by the injectors;

comparing the fuel pressure with a threshold value; and determining the fault in the injection system when the fuel pressure has a first predetermined relationship with the threshold value.

12. The diagnosis method of claim 11, wherein the step of determining a fault in the injection system comprises the step of determining whether the fuel pressure is below the threshold value.

13. The diagnosis method of claim 1, wherein the fault in the injection system is defined by a fuel leak in the injection system.

14. The diagnosis method of claim 1, wherein an engine can be provided which can comprise an exhaust gas recirculating system having a regulating valve, further comprising the step of closing the regulating valve upon detection of the fault in the injection system.

* * * * *

UNITED STATES PATENT AND TRADEMARK OFFICE

CERTIFICATE OF CORRECTION

PATENT NO. : 6,564,616 B2
DATED : May 20, 2003
INVENTOR(S) : Antonioli et al.

It is certified that error appears in the above-identified patent and that said Letters Patent is hereby corrected as shown below:

Title page,
Insert Item -- [75] Inventors: Pierpaolo Antonioli, Piossasco (IT)
Cristiana Davide, Torino (IT)
Mario Reale, Monte Porzio Catone (IT) --

Insert Item -- [30], Foreign Application Priority Data,

Nov. 14, 2000 (IT)....................................T02000A001070 --

Signed and Sealed this

Twenty-first Day of September, 2004

JON W. DUDAS
*Director of the United States Patent and Trademark Office*

UNITED STATES PATENT AND TRADEMARK OFFICE

CERTIFICATE OF CORRECTION

PATENT NO. : 6,564,616 B2
APPLICATION NO. : 09/993380
DATED : May 20, 2003
INVENTOR(S) : Antonioli et al.

It is certified that error appears in the above-identified patent and that said Letters Patent is hereby corrected as shown below:

On Title Page Item (73)
Should Read,

(73) Assignee: C.R.F. Societa Consortile per Azioni, Orbassano, Italy

Signed and Sealed this

Seventeenth Day of April, 2007

JON W. DUDAS
*Director of the United States Patent and Trademark Office*